United States Patent
Lebo et al.

[11] Patent Number: 5,819,803
[45] Date of Patent: Oct. 13, 1998

[54] FLUID PRESSURE REDUCTION DEVICE

[76] Inventors: Kim W. Lebo, 13561 Sandhurst Pl., Santa Ana, Calif. 92705; Sekhar Samy, 2623 E. Yorba Linda Blvd., #119, Fullerton, Calif. 92631

[21] Appl. No.: 602,339

[22] Filed: Feb. 16, 1996

[51] Int. Cl.⁶ .................................................... F15D 1/02
[52] U.S. Cl. .............................. 138/42; 138/40; 138/37; 137/625.3; 251/127
[58] Field of Search .................................. 138/42, 37, 43, 138/40; 137/625.3, 625.37; 251/127

[56] References Cited

U.S. PATENT DOCUMENTS

| | | | |
|---|---|---|---|
| Re. 29,714 | 8/1978 | Hayner et al. .............................. | 138/42 |
| Re. 32,197 | 7/1986 | Self ........................................ | 251/127 |
| 3,722,854 | 3/1973 | Parola ..................................... | 251/127 |
| 3,856,049 | 12/1974 | Scull ...................................... | 138/42 |
| 3,941,350 | 3/1976 | Kluczynski ............................ | 138/42 X |
| 3,978,891 | 9/1976 | Vick ........................................ | 138/42 |
| 4,068,683 | 1/1978 | Self ...................................... | 137/625.3 |
| 4,150,048 | 4/1979 | Self ........................................ | 138/42 |
| 4,267,045 | 5/1981 | Hoof ...................................... | 210/322 |
| 4,279,274 | 7/1981 | Seger ........................................ | 138/42 |
| 4,352,373 | 10/1982 | Kay et al. ................................ | 137/561 |
| 4,407,327 | 10/1983 | Hanson et al. ......................... | 138/42 X |
| 4,427,030 | 1/1984 | Jouwsma ................................ | 138/42 |
| 4,567,915 | 2/1986 | Bates et al. .............................. | 138/42 |
| 4,593,446 | 6/1986 | Hayner .................................. | 138/42 X |
| 5,156,680 | 10/1992 | Orzechowski ......................... | 138/42 X |
| 5,390,896 | 2/1995 | Smirl .................................... | 138/42 X |
| 5,672,821 | 9/1997 | Suzuki ................................... | 138/42 X |

*Primary Examiner*—Patrick F. Brinson
*Attorney, Agent, or Firm*—Vinson & Elkins, L.L.P.

[57] ABSTRACT

A fluid pressure reduction device includes a plurality of flow resistance modules. Each flow resistance module includes two flow segment plates. Fluid enters a flow path in the first flow segment plate, executes two right-angle turns and then enters a flow path in the second flow segment plate. The fluid then executes two more right-angle turns and reenters the first flow segment plate wherein it executes yet two more right-angle turns before returning to the second flow segment plate. A plurality of these double right-angle turns is executed by the flowing fluid before it exits the flow resistance module. Retaining fluid within the openings in the first and second flow segment plates are either a pair of baffle plates placed on either side of the flow segment plates, or the solid portions of adjacent flow segment plates.

17 Claims, 5 Drawing Sheets

FLUID PRESSURE REDUCTION DEVICE

FIELD OF THE INVENTION

The present invention pertains to valves more particularly the present invention pertains to fluid pressure reduction devices used in valves.

BACKGROUND

In numerous fluid-flow applications, either liquid or gas, extremely high pressures are often encountered. Such extremely high pressures can have destructive effects on valves. Specifically, in valves which control the flow of liquids, extremely high pressures may cause valve cavitation or erode the internal portions of the valve thus rendering the valve inoperative. When the valve is placed in a gas flow line, the high-pressure gas may cause acoustical damage to internal valve components and thus render the valve inoperative.

In order to protect the internal components of valves from the damage associated with being placed in a fluid-flow line characterized by extremely high pressures, various fluid-flow pressure reduction devices or energy-loss devices have been proposed. Such devices are illustrated in U.S. Pat. No. 5,390,896, U.S. Reissue Pat. No. 32,197, U.S. Pat. No. 4,567,915, U.S. Pat. No. 4,352,373, U.S. Pat. No. 4,279,274, U.S. Pat. No. 4,267,045, U.S. Reissue Pat. No. 29,714, U.S. Pat. No. 4,068,683, and U.S. Pat. No. 3,722,854. Such devices require the rapid reduction of pressure in a minimal amount of space. However, as fluid-flow pressures increase, so does the space required of the fluid-flow pressure-reduction device.

There is therefore a need in the art for a fluid-flow pressure-reduction device which can effectively reduce the pressure in extremely high-pressure fluid flows yet is still small enough to be placed within commonly available valves.

SUMMARY

The fluid-flow pressure reduction device of the present invention reduces the pressure in extremely high pressure fluid flows, yet is still small enough to be placed within commonly available valves.

A plurality of flow resistance modules make up the fluid-flow pressure reduction device disclosed herein. Each flow resistance module to be placed in a fluid flow path includes two flow segment plates. Fluid enters openings in a first flow segment plate, executes two right-angle turns, then enters openings in a second flow segment plate. The fluid then executes two more right-angle turns and reenters the first flow segment plate wherein it executes yet two more right-angle turns before returning to the second flow segment plate. A plurality of these double right-angle turns is executed by the flowing fluid before it exits the flow resistance module. Retaining fluid within the openings in the first and second flow segment plates are a pair of solid baffle plates or the solid portions of adjacent flow segment plates.

DESCRIPTION OF THE DRAWINGS

A better understanding of the fluid pressure reduction device of the present invention may be had by reference to the figures wherein.

DESCRIPTION OF THE EMBODIMENTS

Figure 1:
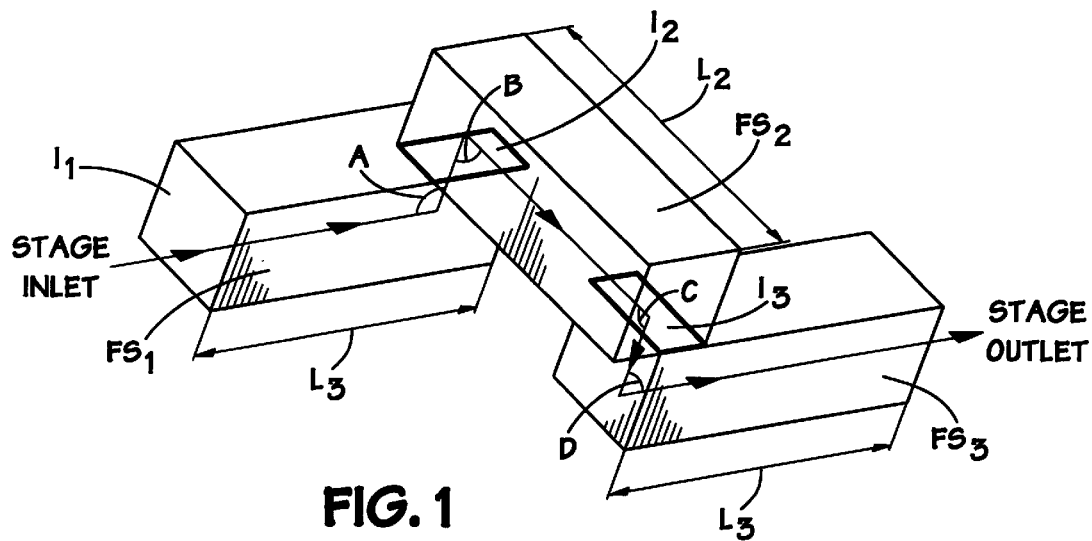
FIG. 1 is a schematic representation of the flow path within a flow resistance module which makes up the fluid pressure reduction device of the present invention.

An appreciation of the principles embodied in the present invention may be had by reference to FIG. 1. Therein it may be seen that fluid flows along the arrow between "stage inlet" and "stage outlet." Specifically, fluid passes through inlet $I_1$ along the length $L_1$ of a first flow segment $FS_1$ before passing into a second flow segment $FS_2$. As may be seen at the right end of the second flow segment $FS_2$, the fluid must traverse right angle A and right angle B before passing through the inlet $I_2$ into the second flow segment $FS_2$. Once the fluid traverses the length $L_2$ of the second flow segment $FS_2$, it then passes through the inlet $I_3$ into a third flow segment $FS_3$. To pass from the second flow segment $FS_2$ into the third flow segment $FS_3$, the flowing fluid must traverse a first right angle C and a second right angle D. The fluid then traverses the length $L_3$ of the third flow segment $FS_3$. This pattern of fluid flow is repeated back and forth throughout the various two-plate flow resistance modules which make up the fluid pressure reduction device 10 of the present invention. While the lengths and areas of flow segments $FS_1$, $FS_2$, and $FS_3$, are shown as being approximately equal in FIG. 1, it will be understood by those of ordinary skill in the art that if the lengths and areas of successive flow segments in the fluid flow path are successively reduced along the flow path, greater resistance to fluid flow will be provided. Thus, as additional resistance to fluid flow is added downstream, further reductions in fluid pressure will occur. The path of fluid flow between the stage inlet and the stage outlet, as shown in FIG. 1, is a serpentine path characterized by double right angle turns as the fluid moves from one flow segment to another.

Figure 2:
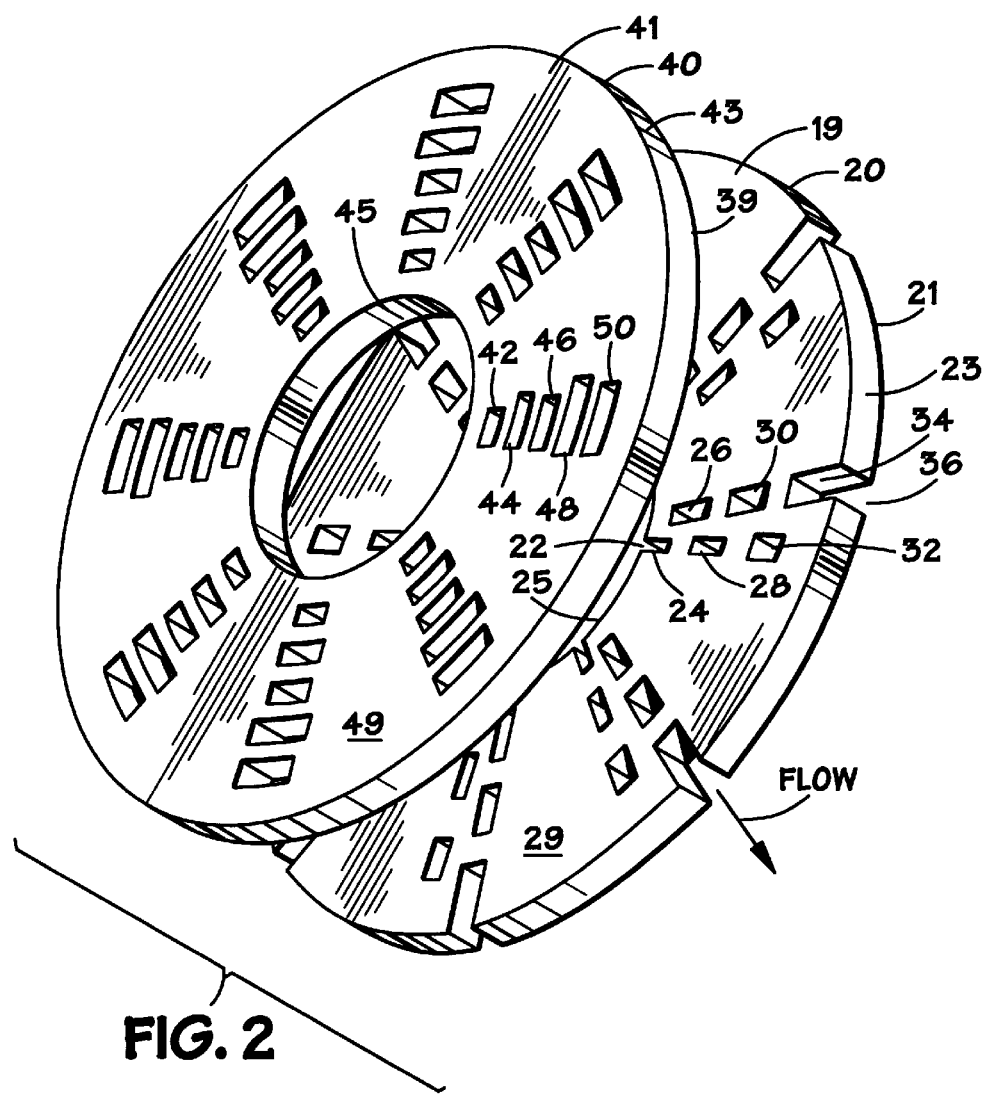
FIG. 2 is a perspective view of first and second flow segment plates used to form a flow resistance module.

The implementation of the schematic flow path shown in FIG. 1 is illustrated in FIG. 2. Specifically shown is a first flow segment plate 20 and a second flow segment plate 40. Both flow segment plates 20 and 40 are formed in a toroidal shape. Specifically, the plates are substantially thick circular planes with a hole formed in the middle. Thus, the geometry of the first flow segment plate 20 is described by an upper surface 19, a lower surface 20, an outer edge 23, an inner edge 25, and a body portion 27. Similarly, the geometry of the second flow segment plate 40 is defined by a lower surface 39, an upper surface 41, an outer edge 43, an inner edge 45, and a body portion 47. As may be seen in FIG. 2, each of the flow segment plates 20 and 40 includes a plurality of openings formed completely through the body portion of the plates. These openings terminate at the upper and lower surfaces of the flow segment plates 20 and 40. 5 By using the teachings of FIG. 1 when viewing FIG. 2, it may be seen that fluid may enter a flow resistance module consisting of two flow segment plates from the inner edge 25 of the first flow segment plate 20 through inlet 22. The fluid then traverses the first flow segment 24 and turns a first right angle to pass into the second flow segment 42. The fluid then makes a second right-angle turn before it makes yet a third right-angle turn to pass 10 into the third flow segment 26 in the first flow segment plate 20. After exiting the third flow segment 26, the fluid passes into the fourth flow segment 44. The fluid traverses the fourth flow segment 44 before it passes into the fifth flow segment 28. From the fifth flow segment 28, the fluid passes back into the second flow segment plate 40 and on into the sixth flow segment 46. From the sixth flow segment 46, the fluid flows to the seventh flow segment 30 in the first flow segment plate 20. From the seventh flow segment 30, the fluid passes into the eighth flow segment 48 before passing into the ninth flow segment 32 in the first flow segment plate 20. From the ninth flow segment 32, the fluid passes into the tenth flow segment 50 in the second flow segment plate 40. The fluid then passes into the eleventh flow segment in the first flow segment plate 20 before exiting through outlet 36.

Figure 3:
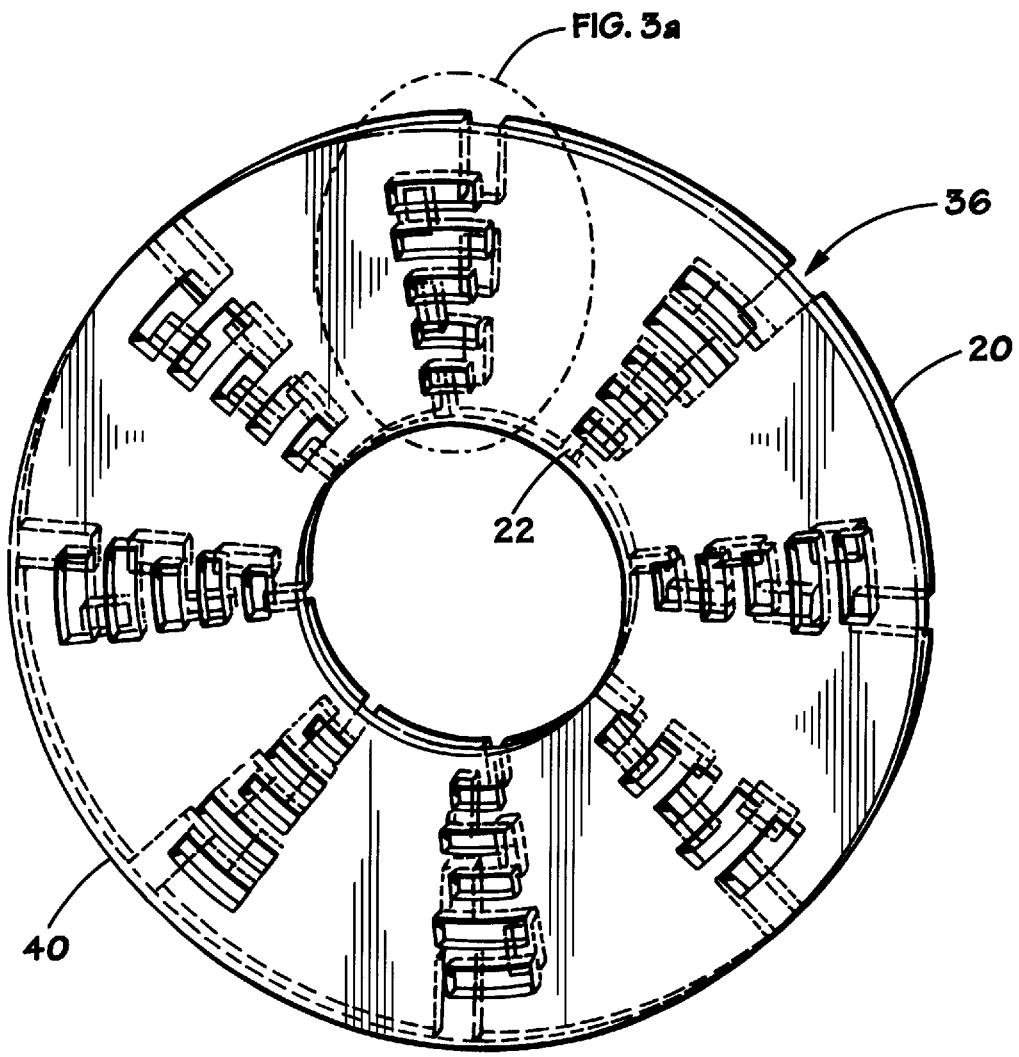
FIG. 3 is a perspective view of the first and second flow segment plates substantially in contact with each other.
Figure 3A:
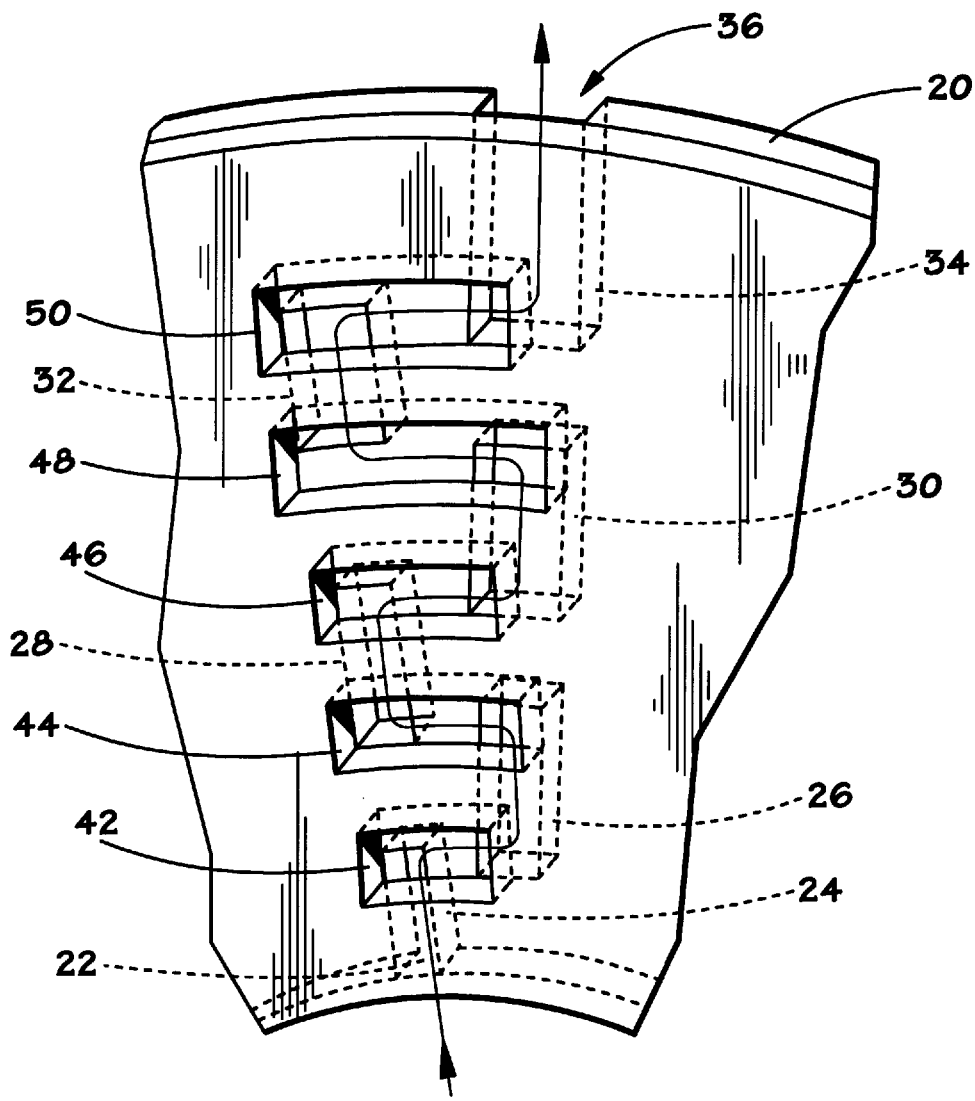
FIG. 3a is an expanded view of a portion of FIG. 3 showing the first and second flow segment plates substantially in contact with a serpentine flow path imposed thereon.

In FIG. 3, the overlap of the various flow segments with one another when the plates are placed substantially in contact is shown. In FIG. 3a, a serpentine flow path is superimposed over an expanded view of the various flow segments placed one over another. As may be specifically seen in FIG. 3a, the various flow segments have differing length and differing areas of overlap with subsequent flow segments. Therefore, in addition to the double right-hand turns which must be executed by the flowing fluid, the variation in flow segment lengths and the variation in overlap of the various flow segments one with another supplements the flow restriction and pressure reduction provided by the double right-hand turns and reduced flow areas through which the fluid must pass before exiting the flow resistance module.

Figure 4:
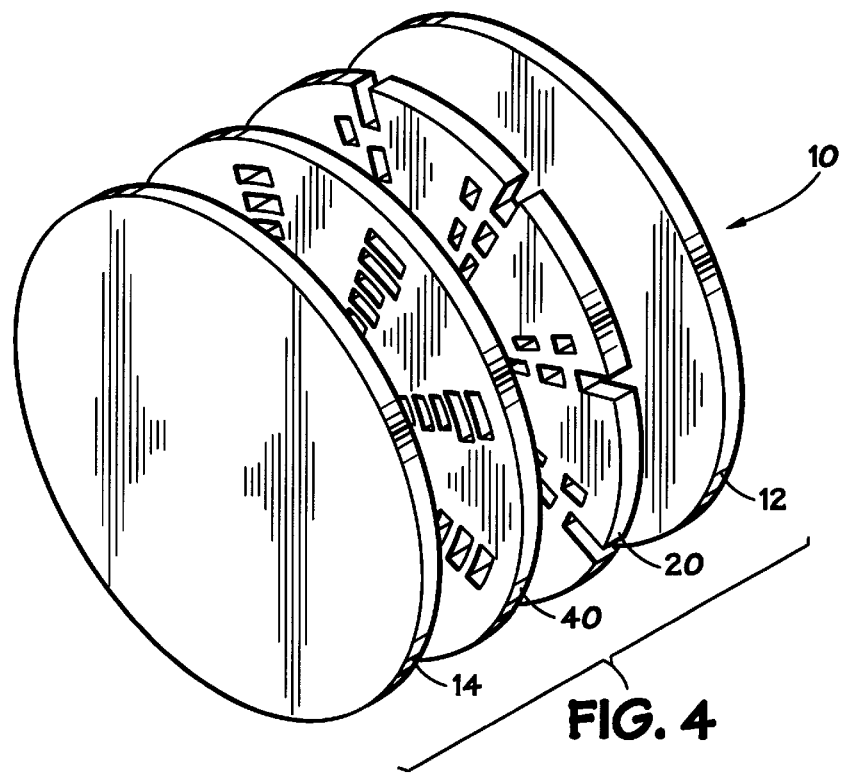
FIG. 4 is a perspective view of a flow resistance module.

Because the open flow segments must be closed on one side to retain fluid within the serpentine flow path, it is necessary to place the first and second flow segment plates 20 and 40 adjacent to a solid surface to close off the individual flow segments. As shown in FIG. 4, the first flow segment plate 20 and the second flow segment plate 40 are placed between a first baffle plate 12 and a second baffle plate 14. While solid baffle plates 12 and 14 are shown, it will be understood by those of ordinary skill in the art that toroidal baffle plates may be used. As will further be understood by those of ordinary skill in the art, it is also possible to replace the first and second baffle plates 12 and 14 by the solid portions of adjacent first and second flow segment plates 20 and 40. The solid portion 29 of the first flow segment plate 20 and solid portion 49 of the second flow segment plate 40 are shown in FIG. 2. Thus, by angularly orienting each module of first and second flow segment plates 20 and 40 with respect to additional modules of flow segment plates, it is possible to accomplish the same sealing effect as is provided by the first and second baffle plates shown in FIG. 4.

Figure 5:
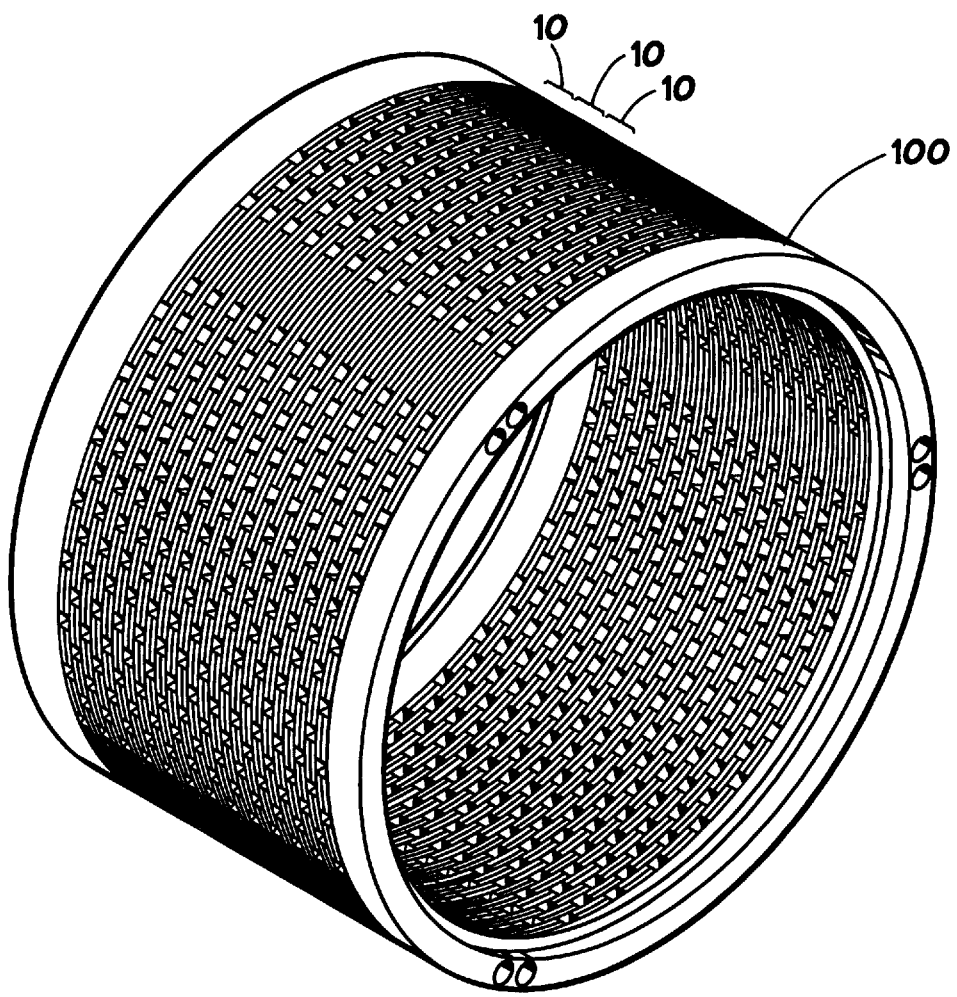
FIG. 5 is a perspective view of a pressure reduction device including a plurality of flow resistance modules.

Shown in FIG. 5 is a stacked plurality of fluid flow modules. Note that the stack of fluid flow modules forms a pressure reduction device 100 which may be utilized in the fluid flow path within a valve housing. Rather than using baffle plates 12 and 14, as shown in FIG. 4, the various fluid flow segment plates are rotated angularly about a central axis, one with respect to another, so that the solid portions of the plates 29 and 49 act as baffles for adjacent flow segment plates to retain the fluid within the various flow segments within the flow segment plates.

Those of ordinary skill in the art will understand that while the fluid pressure reduction device of the present invention has been described with respect to its preferred embodiment modifications may be made to the preferred embodiment without departing from the scope of the present invention. Such additional modifications are to be included within the scope of the appended claims.

We claim:

1. A flow-resistance module for insertion in a fluid path, said flow-resistance module comprising:
    a first baffle plate;
    a second baffle plate having substantially the same perimeter as said first baffle plate;
    first and second flow segment plates constructed and arranged to fit between said first and second baffle plates, said first and second flow segment plates having substantially the same perimeter as said first and second baffle plates;
    a plurality of flow path segments formed in said first and second flow segment plates;
    said plurality of flow path segments forming a serpentine flow path when said first and second flow segment plates are in contact;
    said serpentine flow path including a plurality of double substantially right-angle turns;
    said double substantially right-angle turns causing the fluid to pass from a flow-path segment in either said first or second flow-segment plate to a flow path segment in either said second or first flow segment plate, respectively;
    whereby when flowing fluid passes through said plurality of double substantially right-angle turns as it passes into and out of flow path segments in said first and second flow segment plates its flow pressure will be reduced.

2. The flow resistance module as defined in claim 1 wherein said flow path segments in said first and second flow segment plates vary in size along said serpentine flow path.

3. The flow resistance module as defined in claim 1 wherein said flow path segments are reduced in flow area along said serpentine flow path.

4. The flow resistance module as defined in claim 1 wherein said plates are substantially toroidal.

5. The flow resistance module as defined in claim 4 wherein fluid enters the flow resistance module from the center portion of said toroid and exits from the outer edge of said toroid.

6. The flow resistance module as defined in claim 1 wherein fluid enters and exits from the same flow segment plate.

7. A pressure reduction module to be placed in the path of a flowing fluid, said pressure reduction module comprising:
    first and second substantially toroidal planar baffle plates, said first and second substantially toroidal planar baffle plates having substantially the same inner and outer perimeter;
    a first substantially toroidal planar flow segment plate and a second substantially toroidal planar flow segment plate constructed and arranged to fit between said first and second substantially toroidal planar baffle plates, said first and second substantially toroidal planar flow segment plates having an upper surface, a lower surface, and a body portion between said upper and lower surfaces;
    said first and second substantially toroidal planar flow segment plates having substantially the same inner and outer perimeters as said first and second substantially toroidal planar baffle plates;
    a plurality of openings formed in the body portion of said first and second substantially toroidal planar flow segment plates;
    said plurality of openings forming a serpentine flow path when said first and second substantially toroidal planar flow segment plates are substantially in contact;

said serpentine flow path requiring the flowing fluid to execute two substantially right-angle turns as the flowing fluid flows back and forth between openings in said first and said second substantially toroidal planar flow segment plates.

8. The pressure reduction module as defined in claim 7 wherein said plurality of openings are of different sizes.

9. The pressure reduction module as defined in claim 7 wherein the area available for fluid flow is reduced along said serpentine flow path.

10. The pressure reduction module as defined in claim 7 wherein fluid enters from the inner perimeter of said first substantially toroidal planar flow segment plate and exits from the outer perimeter of said first substantially toroidal planar flow segment plate.

11. The fluid pressure reduction module as defined in claim 7 where fluid enters and exits from the same substantially toroidal planar flow segment plate.

12. A fluid pressure reduction device for minimizing cavitation and erosion damage in liquid valves or acoustical damage in gas valves, said fluid pressure reduction device comprising:
   a plurality of flow resistance modules;
   said flow resistance modules being stacked one on top of another;
   said stack of flow resistance modules being constructed and arranged to fit in the flow path within a valve housing;
   each of said flow resistance modules including:
      first and second substantially toroidal planar baffle plates, said first and second substantially toroidal planar baffle plates having substantially the same inner and outer perimeter;
      a first substantially toroidal planar flow segment plate and a second substantially toroidal planar flow segment plate constructed and arranged to fit between said first and second substantially toroidal planar baffle plates;
      said first and second substantially toroidal planar flow segment plates having an upper surface, a lower surface, and a body portion between said upper and lower surfaces;
      said first and second substantially toroidal planar flow segment plates having substantially the same inner and outer perimeters as said first and second substantially toroidal planar baffle plates;
      a plurality of openings formed in the body portion of said first and second substantially toroidal planar flow segment plates;
      said plurality of openings forming a serpentine flow path when said first and second substantially planar toroidal flow segment plates are substantially in contact;
      said serpentine flow path requiring the flowing fluid to execute two substantially right-angle turns as it flows back and forth between openings in said first and second substantially toroidal planar flow segment plates.

13. The fluid pressure reduction device as defined in claim 12 wherein the openings in said serpentine flow path vary in size along said serpentine flow path.

14. The fluid pressure reduction device as defined in claim 12 wherein the area available for fluid flow is reduced along said serpentine flow path.

15. The fluid pressure let-down device as defined in claim 12 wherein fluid enters from the center of said toroid and exits from the outer edge of said toroid.

16. The fluid pressure let-down device as defined in claim 12 wherein fluid enters and exits from the same flow segment plate.

17. The fluid pressure let-down device as defined in claim 12 wherein said first and second substantially toroidal planar baffle plates are formed from those portions of the upper and lower surfaces of said first and second substantially toroidal planar flow segment plates which do not include the openings formed through the body portion of said first and second substantially toroidal planar flow segment plate.

\* \* \* \* \*